United States Patent
Uno et al.

(10) Patent No.: US 10,351,106 B2
(45) Date of Patent: Jul. 16, 2019

(54) WIPER MOVEMENT DETECTING DEVICE

(71) Applicant: Valeo Japan Co., Ltd., Saitama (JP)

(72) Inventors: Koji Uno, Tokyo (JP); Toaki Yagihara, Tokyo (JP)

(73) Assignee: Valeo Japan Co., Ltd. (JP)

(*) Notice: Subject to any disclaimer, the term of this patent is extended or adjusted under 35 U.S.C. 154(b) by 0 days.

(21) Appl. No.: 15/851,863

(22) Filed: Dec. 22, 2017

(65) Prior Publication Data

US 2018/0178761 A1 Jun. 28, 2018

(30) Foreign Application Priority Data

Dec. 26, 2016 (JP) .................. 2016-251110

(51) Int. Cl.
*B60S 1/08* (2006.01)
*B60Q 9/00* (2006.01)

(52) U.S. Cl.
CPC .............. *B60S 1/087* (2013.01); *B60Q 9/00* (2013.01); *B60S 1/0818* (2013.01); *B60S 1/0833* (2013.01)

(58) Field of Classification Search
CPC ...... B60S 1/087; B60S 1/0818; B60S 1/0833; B60Q 9/00
See application file for complete search history.

(56) References Cited

U.S. PATENT DOCUMENTS 6,097,024 A * 8/2000 Stam .................. B60S 1/0822
250/208.1
6,376,824 B1 * 4/2002 Michenfelder ...... B60Q 1/1423
250/214 R
2008/0136361 A1 * 6/2008 Yoshigoe .............. B60S 1/0818
318/483
2009/0089955 A1 * 4/2009 Ohata ...................... B60S 1/08
15/250.12
2011/0231119 A1 * 9/2011 Cohen .................... B60Q 1/143
702/56

FOREIGN PATENT DOCUMENTS

| EP | 2792555 A1 | 10/2014 |
| JP | H04-349053 A | 12/1992 |
| JP | 2009-090804 A | 4/2009 |

OTHER PUBLICATIONS

English abstract for JP-H04-349053.
European Search Report for Application No. EP 17202425.9 dated May 17, 2018.

* cited by examiner

*Primary Examiner* — Courtney D Heinle
(74) *Attorney, Agent, or Firm* — Fishman Stewart PLLC

(57) ABSTRACT

PROBLEM
To detect a movement of a wiper by the configuration simplified and reduced in costs.
SOLUTION TO PROBLEM
A wiper movement detecting device may include an optical sensor that may be installed to face a glass surface in a vehicle and detect illuminance in an area of the glass surface where the wiper that reciprocates along the glass surface passes through. The detecting device may also include a movement detecting unit configured to detect a reduction time in which the illuminance detected by the optical sensor may temporarily reduce due to the passing of the wiper and determine a movement of the wiper from an interval cycle based upon an interval between the reduction times.

20 Claims, 12 Drawing Sheets

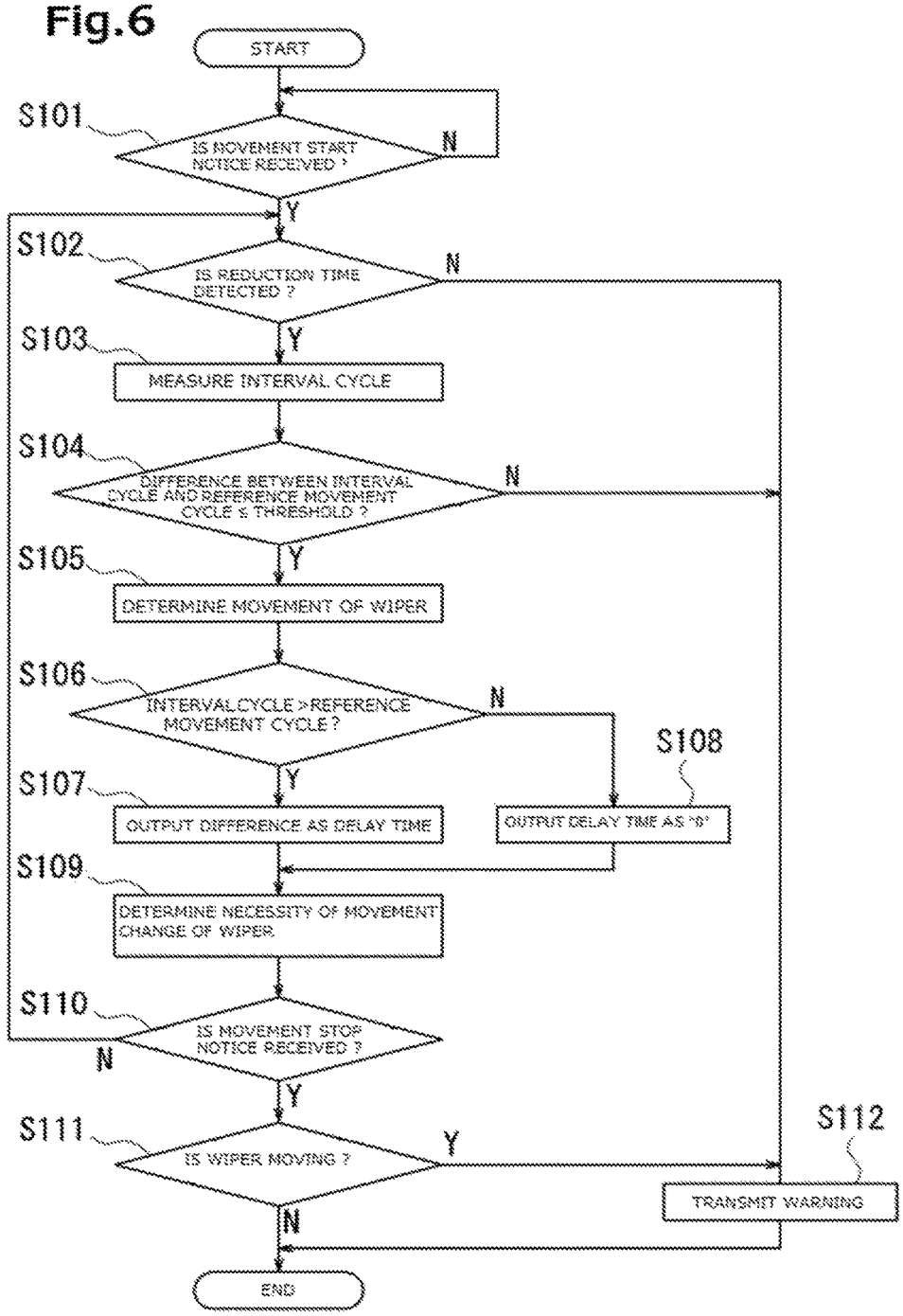

Fig.8

| WIPER DELAY LEVEL | DELAY TIME |
|---|---|
| 9 | 144ms ~ |
| 8 | 128ms ~ |
| 7 | 112ms ~ |
| 6 | 96ms ~ |
| 5 | 80ms ~ |
| 4 | 64ms ~ |
| 3 | 48ms ~ |
| 2 | 32ms ~ |
| 1 | 16ms ~ |
| 0 | 0ms ~ |

Fig.11

| CHANGE AMOUNT IN EVALUATION VALUE AT THE PASSING OF WIPER | WIPER WATER LEVEL |
|---|---|
| 688~719 | 22 |
| 656~687 | 21 |
| 624~656 | 20 |
| 592~623 | 19 |
| 560~591 | 18 |
| 528~559 | 17 |
| 496~527 | 16 |
| 464~495 | 15 |
| 432~463 | 14 |
| 400~431 | 13 |
| 368~399 | 12 |
| 336~367 | 11 |
| 304~335 | 10 |
| 272~303 | 9 |
| 240~271 | 8 |
| 208~239 | 7 |
| 176~207 | 6 |
| 144~175 | 5 |
| 112~143 | 4 |
| 80~111 | 3 |
| 48~79 | 2 |
| 16~47 | 1 |
| 0~15 | 0 |

Fig.12

| WIPER DELAY LEVEL | WIPER STOP CORRECTION COEFFICIENT |
|---|---|
| 8 or more | 3 |
| 6~7 | 2 |
| 4~5 | 1 |
| 0~3 | 0 |

Fig.13

| | WIPER STOP CORRECTION COEFFICIENT | | | |
|---|---|---|---|---|
| | 0 | 1 | 2 | 3 |
| WIPER WATER LEVEL | < 2 | < 4 | < 8 | < 16 |

WIPER MOVEMENT DETECTING DEVICE

CROSS-REFERENCE TO RELATED APPLICATION

This application claims priority under 35 USC 119 from Japanese Patent Application No. 251110/2016 filed on Dec. 26, 2016, the disclosure of which is incorporated by reference herein.

BACKGROUND OF THE INVENTION

Field of the Invention

The present invention relates to a wiper movement detecting device.

Description of the Related Art

A wiper is installed in a vehicle to wipe off rain droplets attached on a glass surface of a window at the rainfall. The wiper is configured in such a manner as to be able to step-by-step change a movement speed or the like by an operation of a driver, but there is proposed a technology of automatically controlling the movement of the wiper in response to a change in a rainfall state without the operation of the driver. For example, a rain droplet sensor is installed on the glass surface to detect an amount of rain droplets attached on the glass surface at raining and adjust the movement speed or the like of the wiper corresponding to the amount of the rain droplets (for example, refer to Japanese Patent Laid-Open No. 04-349053 A).

During the movement of the wiper, however, the rain droplets wiped off by the wiper move on the glass surface. There are some cases where although it is raining heavily, the rain droplets are wiped off from a detection area of the rain droplet sensor, or although the raining amount is reduced, the rain droplets concentrate on the detection area. In such a case, the detection result of the rain droplet sensor does not reflect a change in the rainfall state accurately.

Therefore there is proposed a technology in which a pulse signal that is outputted from a wiper motor is acquired to detect the movement of the wiper, and the detection result is used for determination of a change in the rainfall state (for example, refer to Japanese Patent Laid-Open No. 2009-090804 A).

SUMMARY OF THE INVENTION

However, for detecting the movement of the wiper in response to the pulse signal outputted from the wiper motor, components such as connectors and harnesses for connection with the wiper motor and a device equipped with hardware and software for analyzing the pulse signal are required, leading to an increase in costs.

The present invention has an object of providing a wiper movement detecting device that can detect a movement of a wiper with the configuration simplified and reduced in costs.

A wiper movement detecting device according to the present invention comprises an optical sensor that is installed to face a glass surface in a vehicle and detect illuminance in an area of the glass surface where the wiper that reciprocates along the glass surface passes through, and a movement detecting unit configured to detect a reduction time in which the illuminance detected by the optical sensor temporarily reduces due to the passing of the wiper and determine the movement of the wiper from an interval cycle based upon an interval between the reduction times.

According to the present invention, the reduction time of the illuminance caused by the passing of the wiper through the detection area of the optical sensor can be detected, and the movement of the wiper can be determined from the interval cycle based upon the interval between the reduction times. In many cases the optical sensor is preliminarily installed in a vehicle for lighting control of a headlight. Therefore, for example, in contrast to a case of detecting the movement of the wiper in response to the pulse signal outputted from the wiper motor, introduction of special components, hardware and software is not required. Thereby it is possible to provide the wiper movement detecting device simplified and reduced in costs. Further, from the detection result of the movement of the wiper, the movement of the wiper can be changed in response to a change in the rainfall state and abnormality of the wiper can be detected, thus improving safety and comfortableness of a vehicle.

BRIEF DESCRIPTION OF THE DRAWINGS

FIG. 6 is a flow chart explaining processing in the wiper movement detecting device.

FIG. 8 is an explanatory diagram explaining a delay time map.

FIG. 11 is an explanatory diagram explaining a wiper wiped water map.

FIG. 12 is an explanatory diagram explaining a correction coefficient map.

FIG. 13 is an explanatory diagram explaining a determination map.

DESCRIPTION OF THE PREFERRED EMBODIMENTS

Hereinafter, an explanation will be made of a wiper movement detecting device according to an embodiment of the present invention. The wiper movement detecting device detects a movement of a wiper installed in a vehicle. First, the wiper installed in the vehicle will be explained.

Figure 1:
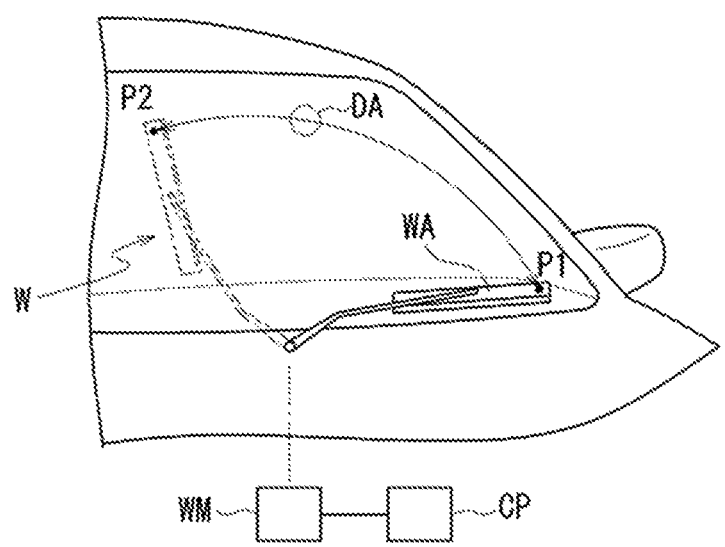
FIG. 1 is a schematic diagram illustrating the configuration and movement of a wiper installed in a vehicle.

FIG. 1 is a schematic diagram illustrating the configuration and movement of a wiper installed in a vehicle.

As illustrated in FIG. 1, a wiper W in a vehicle is provided with a wiper arm WA that wipes off a glass surface, and a wiper motor WM that drives the wiper arm WA. The wiper arm WA performs a reciprocal movement in such a manner as to move from an initial position P1 to a reverse position P2 while wiping off the glass surface, and thereafter, return from the reverse position P2 back to the initial position P1.

The wiper has a plurality of movement modes. A movement speed and an intermittent time of the wiper are set to differ depending upon the movement mode. The intermittent time is a time provided as a period from a reciprocal movement of one time to the reciprocal movement of the next time to set the movement of the wiper to "off". A time of a combination of a time in the reciprocal movement of the wiper of one time and the intermittent time after that is defined as one cycle of the movement of the wipe.

A kind of the movement mode is not limited to a particular one, but may include, for example, "an intermittent driving mode" in which the wiper performs a low-speed drive and the intermittent time is relatively long, "a low-speed driving mode" in which the wiper performs a low-speed drive but the intermittent time is relatively short, "a high-speed driving mode" in which the wiper performs a high-speed drive and the intermittent time as well is relatively short, and "a successive driving mode" in which the wiper performs a high-speed drive and the intermittent time is very few.

A driver operates an unillustrated wiper switch to specify the movement mode. Control of the movement of the wiper is performed by an in-vehicle processor CP. The in-vehicle processor CP outputs a driving signal to the wiper motor WM in accordance with the movement mode specified by the driver to control the movement speed and the intermittent time of the wiper. The wiper motor WM operates the wiper arm WA in response to the driving signal. The in-vehicle processor CP performs control of the other in-vehicle facilities as well, such as head lights, a navigation device and the like, but herein, an explanation thereof is omitted.

Next, an explanation will be made of the configuration of the wiper movement detecting device.

Figure 2:
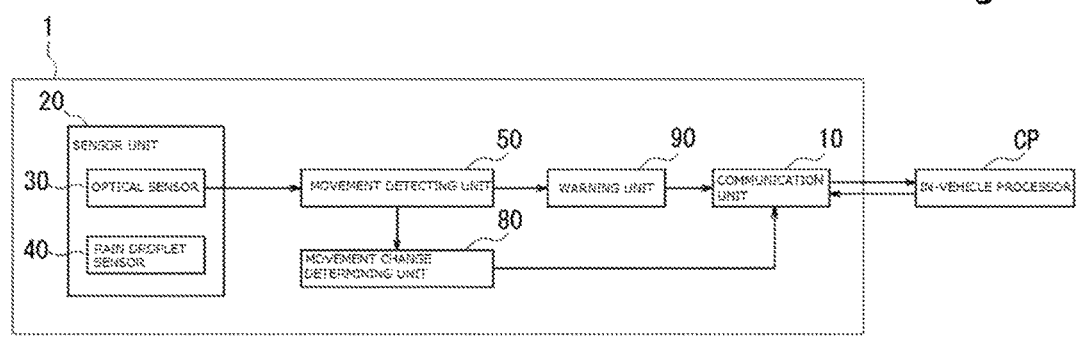
FIG. 2 is a block diagram illustrating a wiper movement detecting device according to an embodiment of the present invention.

FIG. 2 is a block diagram illustrating the wiper movement detecting device according to the embodiment of the present invention.

As illustrated in FIG. 2, the wiper movement detecting device 1 is provided with a communication unit 10, a sensor unit 20, a movement detecting unit 50, a movement change determining unit 80, and a warning unit 90.

The communication unit 10 makes communications with the in-vehicle processor CP by wired or wireless. The in-vehicle processor CP, at the time of starting and stopping the movement of the wiper, transmits a movement start notice and a movement stop notice of the wiper to the communication unit 10. The movement start notice of the wiper includes a notice of the movement mode for moving the wiper. In addition, as in detail described later, the communication unit 10 transmits the determination result of the movement change determining unit 80 to the in-vehicle processor CP.

Figure 3:
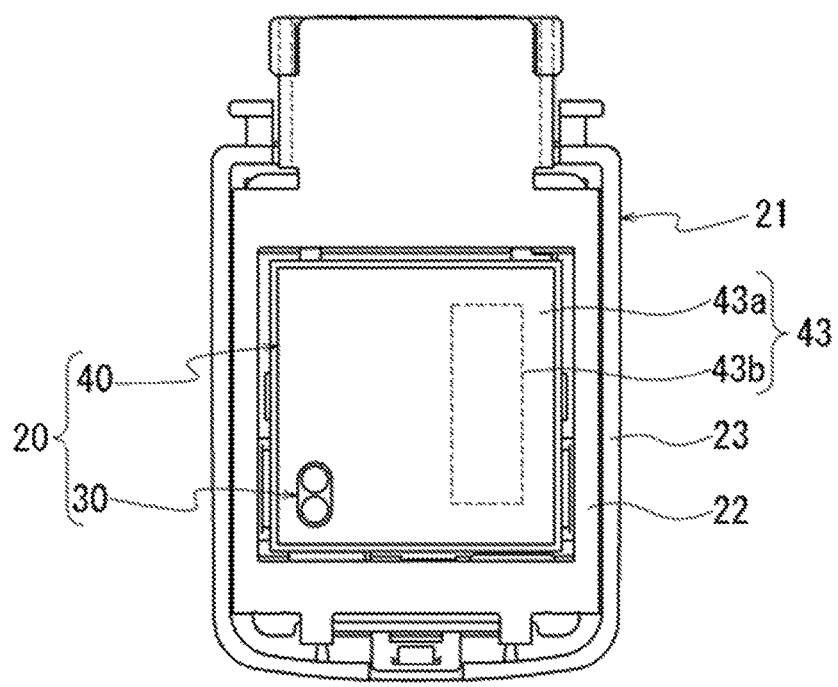
FIG. 3 is a plan view illustrating the configuration of a sensor unit.
Figure 4:
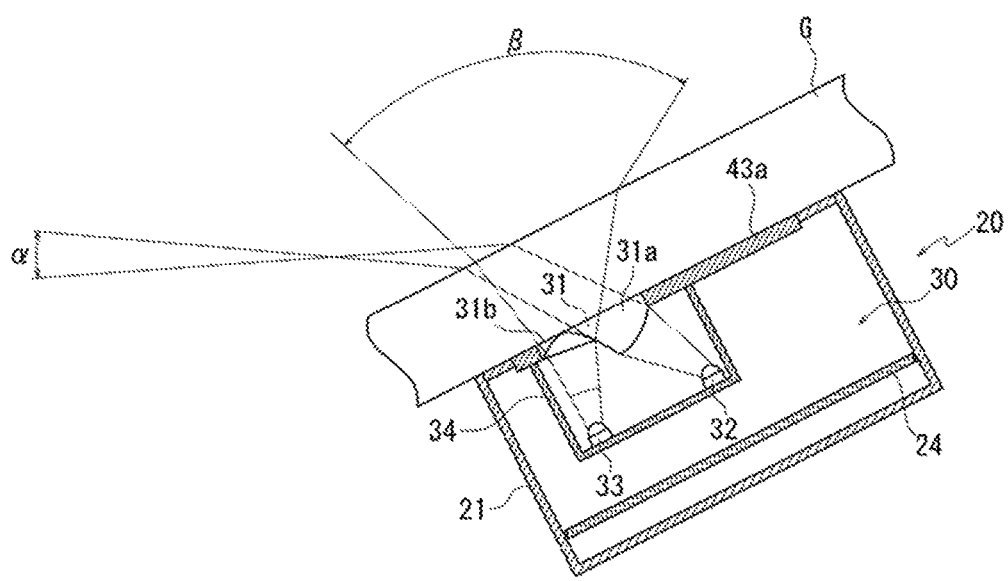
FIG. 4 is a diagram explaining the configuration of an optical sensor.
Figure 5A:
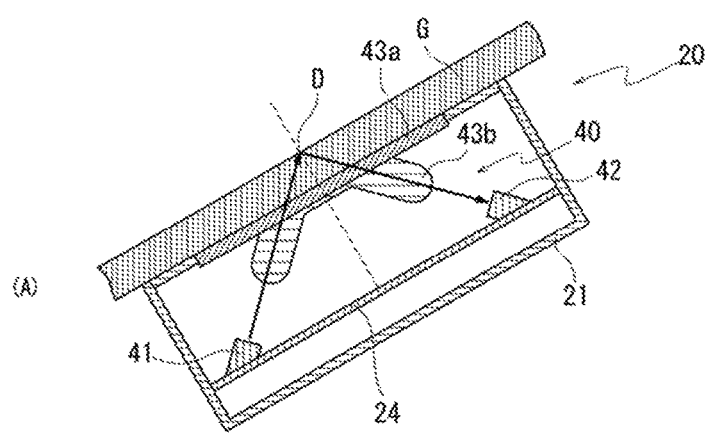
FIG. 5A is a diagram explaining the configuration of a rain droplet sensor.
Figure 5B:
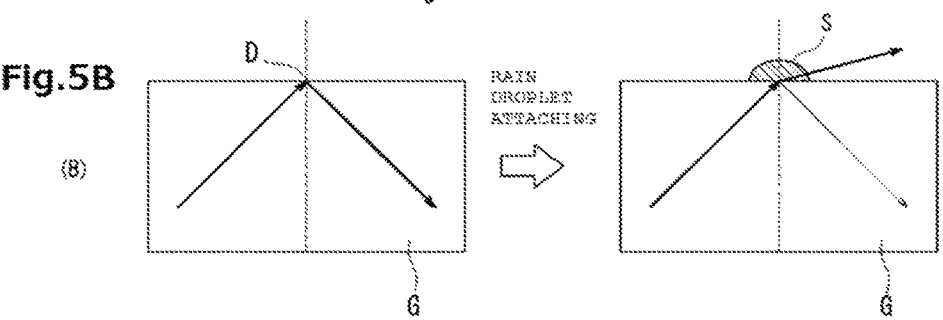
FIG. 5B is a diagram explaining a detection principle of rain droplets by the rain droplet sensor.

The sensor unit 20 is provided with an optical sensor 30 that measures illuminance, and a rain droplet sensor 40 that detects rain droplets. FIG. 3 is a plan view illustrating the configuration of the sensor unit 20. FIG. 4 is a diagram explaining the configuration of the optical sensor 30. FIG. 5A is a diagram explaining the configuration of the rain droplet sensor 40. FIG. 5B is a diagram explaining a detection principle of rain droplets by the rain droplet sensor 40. It should be noted that FIG. 4 and FIG. 5A are diagrams as viewed from a section direction of a glass surface G on which the sensor unit 20 is attached, but for easy understanding, the optical sensor 30 and the rain droplet sensor 40 are schematically illustrated and do not conform to the optical sensor 30 and the rain droplet sensor 40 in dimension as illustrated in FIG. 3.

As illustrated in FIG. 3, the sensor unit 20 integrally accommodates the optical sensor 30 and the rain droplet sensor 40 in the inside of a housing 21. The housing 21 is formed by combining a plate-shaped bracket 22 and a doom-shaped cover 23. As illustrated in FIG. 4, the optical sensor 30 is provided with a lens 33 that collects visible light from an exterior of the housing 21, and a front light receiving element 32 and an upper light receiving element 33 that respectively receive the visible lights collected by the lens 31. As illustrated in FIG. 5A, the rain droplet sensor 40 is provided with alight emitting element 41 that emits infrared light, alight receiving element 42 that receives infrared light, and a prism 43 (a plate-shaped portion 43a and a light guiding portion 43b, which will be described later). The prism 43 guides the infrared light emitted by the light emitting element 41 onto the glass surface G and guides the infrared light reflected on the glass surface G to the light receiving element 42.

As illustrated in FIG. 3, the sensor unit 20 is configured such that the optical sensor 30 using the visible light and the rain droplet sensor 40 using the infrared light are accommodated in the same housing 21. Therefore the optical sensor 30 and the rain droplet sensor 40 are arranged in the inside of the housing 21 for the visible light or the infrared light used to each other not to interfere with the respective movements.

As illustrated in FIG. 3 and FIG. 5A, the prism 43 in the rain droplet sensor 40 has the rectangular plate-shaped portion 43a and the light guiding portion 43b attached on one surface of the plate-shaped portion 43a. Although omitted in illustration, a black filter allowing transmission of the infrared light only is attached on a surface of the plate-shaped portion 43a, the surface opposing an attachment surface of the plate-shaped portion 43a to the light guiding portion 43b. A rectangular through hole is formed in the center of the bracket 22 of the housing 21, and the plate-shaped portion 43a is fitted in the through hole. The plate-shaped portion 43a is arranged such that the attachment surface to the light guiding portion 43b faces the inside of the housing 21 and the surface on which the black filter is attached is exposed to an exterior of the housing 21. The light emitting element 41 and the light receiving element 42 in the rain droplet sensor 40 are arranged right under the light guiding portion 43b.

An area in the plate-shaped portion 43a of the prism 43 that is near a corner thereof and is away from an attachment section thereof to the light guiding portion 43b is punched out in a rectangle having rounded corners. The lens 31 in the optical sensor 30 is fitted in the area. As illustrated in FIG. 4, the front light receiving element 32 and the upper light receiving element 33 are arranged right under the lens 31. The periphery of the lens 31, the front light receiving element 32 and the upper light receiving element 33 is covered with a cover member 34. Since the black filter is attached on the prism 43 in the rain droplet sensor 40, the infrared light only transmits through the inside of the housing 21. The visible light transmits through a section of the optical sensor 30 in which the lens 31 is fitted, but since the optical sensor 30 is covered with the cover member 34, the visible light does not reach the light emitting element 41 and the light receiving element 42 in the rain droplet sensor 40.

As illustrated in FIG. 4 and FIG. 5A, the sensor unit 20 is attached on the glass surface G of a front window in a vehicle. At this time, an unillustrated adhesive sheet having optical transparency is attached on the plate-shaped portion 43a in the prism 43. The plate-shaped portion 43a is arranged to be in close contact with the glass surface G inside of the vehicle through the adhesive sheet and to be directed outward of the vehicle. The sensor 20 is arranged in an area where any one of a set of two wipers passes through and in a position where a range of view of a driver is not blocked. For example, the sensor unit 20 may be arranged above the front window and near a rear view mirror.

Next, an explanation will be made of a specific configuration of each of the optical sensor 30 and the rain droplet sensor 40. As illustrated in FIG. 4, the lens 31 in the optical sensor 30 configures a front-light light guiding portion 31a that guides the visible light to the front light receiving element 32 and an upper-light light guiding portion 31b that guides the visible light to the upper light receiving element 33 integrally. The lens 31 uses a lens having a refraction index equivalent to that of the glass surface G.

The front-light light guiding portion 31a and the upper-light light guiding portion 31b each have an upper surface making close contact with the glass surface G, the upper surface being formed of a flat surface. A lower surface of the front-light light guiding portion 31a positioned in the inside of the housing 21 is formed of a convex surface, and the front-light light guiding portion 31a forms a convex lens. An optical axis of the front-light light guiding portion 31a is incident to the glass surface G from the front side of a vehicle and travels toward the rear side of the vehicle in the inside of the housing 21. On the other hand, a lower surface of the upper-light light guiding portion 31b positioned in the inside of the housing 21 is formed of a concave surface, and the upper-light light guiding portion 31b forms a concave lens. When an optical axis of the upper-light light guiding portion 31b is incident to the glass surface G from the upper side of the vehicle and enters the inside of the housing 21, the optical axis of the upper-light light guiding portion 31b travels in a direction away from the optical axis of the front-light light guiding portion 31a.

The front light receiving element 32 is arranged on the optical axis of the front-light light guiding portion 31a. Thereby the front light receiving element 32 receives light from a visual field range α(°) formed in a conical shape in the front side of the vehicle. The upper light receiving element 33 is arranged on the optical axis of the upper light guiding portion 31b. Thereby the upper light receiving element 33 receives light from a visual field range β(°) formed in a conical shape in the upper side of the vehicle. The visual field range α and the visual field range β are set not to overlap. The front light receiving element 32 and the upper light receiving element 33 generate light receiving signals (electrical signals) having a level in accordance with a light received amount. That is, the optical sensor 30 detects illuminance in the front side and illuminance in the upper side of the vehicle by the front light receiving element 32 and the upper light receiving element 33.

As illustrated in FIG. 5A, the light emitting element 41 in the rain droplet sensor 40 is arranged such that the emitted infrared light is incident at a predetermined angle to the glass surface G. The light receiving element 42 is arranged on an optical path of the reflected infrared light for receiving the infrared light reflected on the glass surface G. A pulse signal is input to the light emitting element 41 from an unillustrated light emitting control unit. The light emitting element 41 emits light onto a detection face D for each predetermined cycle defined by the pulse signal. When rain droplets S and the like are not attached on the detection face D, the infrared light emitted by the light emitting element 41 is guided by the light guiding portion 43b of the prism 43, reaches the glass surface G through the plate-shaped portion 43a, and is reflected on the detection face D in a predetermined size on the glass surface G. The reflective light reflected on the detection face D, travels through the plate-shaped portion 43a, and is guided to the light receiving element 42 by the light guiding portion 43b through the plate-shaped portion 43a. The light receiving element 42 generates a light receiving signal (electrical signal) having a level in accordance with the light received amount.

As illustrated in FIG. 5B, When the rain droplets S are attached on the detection face D, since the light emitted by the light emitting element 41 is partially dispersed by the rain droplets S, the light received amount of the light receiving element 42 reduces in accordance with the amount of the rain droplets S attached on the detection face D. Accordingly the light receiving element 42 provides output of a level differing depending upon the rain droplets S attached on the detection face D. At this time, as the amount of rain droplets attached on the detection face D is the larger, an output value of the light receiving element 42 is the smaller, and therefore the amount of the rain droplets attached on the detection face D can be detected based upon the output value of the light receiving element 42.

It should be noted that since the sensor unit 20 integrally provided with the optical sensor 30 and the rain droplet sensor 40 is used herein, the configuration of the rain droplet sensor 40 as well is explained. However, in the embodiment, an example of using only the output value of the optical sensor 30 for the processing of the wiper movement detecting device 1 will be explained. Accordingly the sensor unit 20 may be configured to use the optical sensor 30 alone.

As illustrated in FIG. 4 and FIG. 5A, a substrate 24 is installed in the inside of the housing 21 of the sensor unit 20. Although omitted in illustration, a processor, a memory, a communication circuit and the like are arranged on the substrate 24. When the processor executes a program stored in the memory, a functional configuration of the wiper movement detecting device 1 illustrated in FIG. 1 is realized. The memory further stores information required for the processing of the wiper movement detecting device 1. It should be noted that although herein omitted in illustration, the processor of the sensor unit 20 may realize a functional configuration other than the wiper movement detecting device 1. For example, the processor may determine necessity for the lighting of the headlight based upon the output value of the optical sensor 30. In addition, the processor for realizing the functional configuration of the wiper movement detecting device 1 is not necessarily the processor installed on the substrate 24 in the sensor 20, but may be a processor different therefrom or may be composed of a combination of the processor in the sensor 20 and another processor.

The movement detecting unit 50 in FIG. 2 detects a movement of the wiper based upon the illuminance detected by the optical sensor 30. The movement detecting unit 50 uses the illuminance detected by the front light receiving element 32 out of the front light receiving element 32 and the upper light receiving element 33 in the optical sensor 30. When the movement detecting unit 50 receives a movement start notice of the wiper from the in-vehicle processor CP, the movement detecting unit 50 detects a time (hereinafter, referred to as "reduction time") in which the illuminance detected by the optical sensor 30 temporarily reduces due to the passing of the wiper. The movement detecting unit 50 determines the movement of the wiper from an interval cycle based upon an interval between the detected reduction times.

Specifically the movement detecting unit 50 measures an interval cycle between one reduction time and a reduction time ahead of two reduction times therefrom and calculates a difference between the measured interval cycle and a reference movement cycle of the wiper. In a case where the difference between the interval cycle and the reference movement cycle is equal to or less than a threshold, the movement detecting unit 50 determines that the wiper is moving.

In a case where the movement detecting unit 50 determines that the wiper is moving, the movement detecting unit 50 inputs the calculated difference to the movement change determining unit 80 as a delay time. In a case where the movement detecting unit 50 cannot determine that the wiper is moving, the movement detecting unit 50 inputs the determination result to the warning unit 90.

Also in a case where the movement detecting unit 50 receives the movement stop notice of the wiper from the in-vehicle processor CP, the movement detecting unit 50 performs the determination of the movement of the wiper. In a case where the movement detecting unit 50 performs the determination of the movement of the wiper after receiving the movement stop notice of the wiper, the movement detecting unit 50 inputs the determination result to the warning unit 90.

When the warning unit 90 receives input from the movement detecting unit 50, the warning unit 90 generates a warning signal of communicating abnormality of the wiper. The generated warning signal is transmitted to the in-vehicle processor CP through the communication circuit. When the in-vehicle processor CP receives the warning signal, the in-vehicle processor CP communicates the abnormality of the wiper to a driver. The form of the communicating is not limited to a particular one, but, for example, a lamp may be provided to communicate the abnormality of the wiper to switch on the lamp. Alternatively, the notice of the abnormality of the wiper may be displayed on a display of the navigation device. Further, instead of transmitting the warning signal to the in-vehicle processor CP, the wiper movement detecting device 1 itself may be provided with, for example, a lamp or a buzzer sound as the warning unit 90 to communicate the abnormality by lightening on the lamp or sounding the buzzer. The lamp or buzzer may be installed in the housing 21 of the sensor unit 20, for example.

The movement change determining unit 80 determines necessity of a change of the wiper movement based upon the delay time that is input by the movement detecting unit 50. The movement change determining unit 80 transmits the determination result to the in-vehicle processor CP. The in-vehicle processor CP performs the change of the movement of the wiper, and the like based upon the determination result of the movement change determining unit 80. The change in the movement may include a change in a movement speed, a change in a movement mode, a stop of the movement of the wiper, and the like.

Hereinafter, an explanation will be made of the details of the processing to be executed in the wiper movement detecting device 1.

FIG. 6 is a flow chart explaining the processing in the wiper movement detecting device 1.

As illustrated in FIG. 6, when a movement start notice of the wiper is received from the in-vehicle processor CP (step S101), the movement detecting unit 50 starts the processing of detecting the movement of the wiper.

The movement detecting unit 50 refers to the illuminance outputted by the front light receiving element 32 of the optical sensor 30 in the sensor unit 20 for detecting the movement of the wiper.

Figure 7:
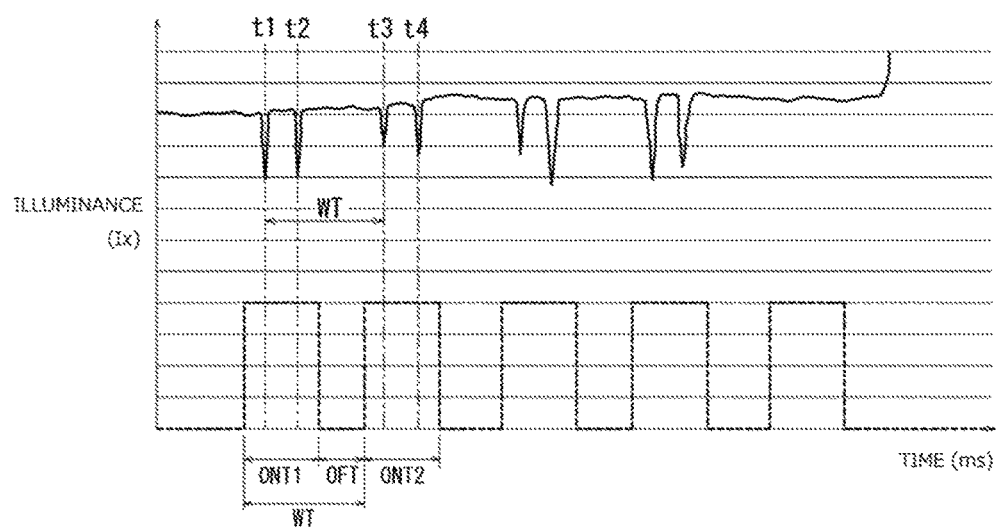
FIG. 7 is a graph illustrating an example of a change in an output value of the optical sensor by the movement of the wiper.

FIG. 7 is a graph illustrating an example of a change in an output value of the optical sensor 30 by the movement of the wiper. A solid line in the graph in FIG. 7 indicates the output value of the optical sensor 30. A broken line in a lower side in FIG. 7 indicates a pulse signal outputted from the wiper motor WM at the time of driving the wiper. When the pulse signal is "on", the wiper performs a reciprocal movement indicated in FIG. 1. When the pulse signal is "off", that period is an intermittent time in the reciprocal movement.

On the other hand, by referring to the output value of the optical sensor 30, a time (t1, t2, t3, t4) in which the illuminance temporarily reduces appears intermittently and repeatedly during the movement of the wiper. As illustrated in FIG. 1, at the time the wiper moves, the wiper passes through the detection area DA of the optical sensor 30. At the passing of the wiper, the light in the detection area DA is temporarily blocked, which causes the illuminance as well detected by the optical sensor 30 to be temporarily reduced. When the wiper continues to move, the time in which the illuminance temporarily reduces is intermittently successive.

Here, by referring to the pulse signal of the wiper motor WM, a time by a combination of an "on" time ONT1 and an "off" time OFFT of the pulse signal is equal to a movement cycle WT of the wiper. On the other hand, by referring to the output value of the optical sensor 30, the reduction time of the illuminance appears twice during the "on" time of the pulse signal. The wiper passes through the detection area DA of the optical sensor 30 twice during a period of reciprocating between an initial position P1 and a reverse position P2. Therefore the reduction time of the illuminance appears twice during the "on" time of one time. An interval between a first reduction time t1 appearing in one "on" time ONT1 and a first reduction time t3 appearing in the next "on" time ONT2 is the same as the movement cycle WT of the wiper.

That is, the reduction time of the illuminance of the optical sensor 30 is detected, a cycle of the interval (interval cycle) between a reduction time and a reduction time ahead of two reduction times therefrom is measured, and it is determined whether or not the interval cycle corresponds to the movement cycle of the wiper, thus making it possible to determine whether or not the wiper is moving.

As the specific processing, when the movement detecting unit 50 receives the movement start notice of the wiper (step S101), the movement detecting unit 50 detects the reduction time in which the illuminance temporarily reduces by the passing of the wiper, based upon the output value of the optical sensor 30 (step S102).

An example of factors for causing a reduction of the illuminance of the optical sensor 30 may include factors other than the passing of the wiper, such as a change in the weather, a travel through a tunnel, or the like. Therefore the reduction time (for example, 5 ms) of the illuminance or the reduction rate (for example, 20%) of the illuminance at the passing of the wiper, and the like are preliminarily found by measurement experiments, simulations or the like, which are stored as thresholds in a memory. The movement detecting unit 50 performs detection of the reduction time by comparing the illuminance outputted by the optical sensor 30 as needed with the threshold.

When the movement detecting unit 50 detects the reduction time (step S102: Yes), an interval cycle in regard to the detected reduction time is measured. When the movement detecting unit 50 measures an interval between the first detected reduction time and a reduction time ahead of two reduction times therefrom, next the movement detecting unit 50 measures an interval between the second detected reduction time and a reduction time ahead of two reduction times therefrom. In this way, the movement detecting unit 50 performs the measurement of the interval cycle by measuring the interval between the detected reduction time and the reduction time ahead of the two reduction times therefrom sequentially.

In a case where the movement detecting unit 50 compares the measured interval cycle with the reference movement cycle and the difference is equal to or less than a threshold (step S104: Yes), it is determined that the wiper is moving (step S105). The reference movement cycle is a reference value of the movement cycle of the wiper. The reference movement cycle is preliminarily determined by measurement experiments, simulations or the like, which is stored in the memory. Since the movement cycle of the wiper differs for each movement mode, the reference movement cycle is also provided for each movement mode. The movement detecting unit 50 acquires a reference movement cycle corresponding to the movement mode indicated in the movement start notice of the wiper from the memory. The threshold used for comparison in the difference between the interval cycle and the reference movement cycle indicates a maximum allowance value of an error between the reference movement cycle and an actual movement cycle of the wiper. As described before, the movement speed and the intermittent time of the wiper are preliminarily set to constant values in accordance with the movement mode. When the movement speed and the intermittent time are always constant, the interval cycle becomes constant. However an actual movement speed of the wiper on the glass surface G is not necessarily constant, and as a result, in some cases the interval cycle is not constant either.

As a factor causing the above, there is a change in a state of the glass surface G caused by a rainfall state. For example, when a rainfall becomes heavy and the glass surface G is sufficiently wet because of rain droplets, there is a tendency that a friction between the glass surface G and the wiper arm WA becomes smaller and the movement speed of the wiper becomes faster. In this case, the interval cycle between the reduction times becomes shorter. On the other hand, when a rainfall becomes lighter and an amount of rain droplets on the glass surface G becomes smaller, there is a tendency that the friction between the glass surface G and the wiper arm WA increases and the movement speed of the wiper becomes slower. In this case, the interval cycle between the reduction times is also longer.

In this way, the change in the state of the glass surface G causes the error between the interval cycle and the reference movement cycle. However, abnormality of the wiper motor WM as well possibly causes an increase in a difference between the interval cycle and the reference movement cycle. When there occurs the abnormality in the wiper motor WM, the wiper possibly moves in a speed that is very different from the movement speed set in the movement mode. Therefore a range in the change of the interval cycle caused by the change in the state of the glass surface G is preliminarily measured to be found, and a maximum value of the difference between the range of the interval cycle and the reference movement cycle is set as a threshold. In addition, in a case where the difference between the interval cycle and the reference movement cycle is equal to or less than the threshold, the movement detecting unit 50 determines that the wiper is moving. By such a setting of the threshold, the movement detecting unit 50 determines not only whether or not the wiper is moving but also whether or not the wiper is normally moving according to the movement mode.

In addition, caused by a factor other than the movement of the wiper, singly the difference between the interval cycle and the reference movement cycle is possibly equal to or less than the threshold. Further, in such a case as to pass under a bridge beam, the state where the difference between the interval cycle and the reference movement cycle is equal to or less than the threshold is possibly successive in a short time. Therefore the movement of the wiper may be determined by performing the comparison between the measurement of the interval cycle and the reference movement cycle by a predetermined number of times (for example, 30 times). In the comparison of the predetermined number of times, in a case where the difference between the interval cycle and the reference movement cycle is all equal to or less than the threshold, the movement detecting unit 50 may determine that the wiper is moving. In addition, in the predetermined number of times, when a percentage in which the difference between the interval cycle and the reference movement cycle is equal to or less than the threshold is, for example, approximately 80%, the movement detecting unit 50 may determine that the wiper is moving.

At step S105, in a case where the movement of the wiper is determined, the interval cycle measured at step S103 indicates an actual movement cycle of the wiper. That is, the difference between the interval cycle and the reference movement cycle indicates a delay time of the wiper. However, a case where the difference between the interval cycle and the reference movement cycle indicates the delay time of the wiper is a case where the interval cycle is longer than the reference movement cycle. In some cases the interval cycle is shorter than the reference movement cycle depending upon the state of the glass surface G, but in that case, there occurs no delay in the movement of the wiper. Therefore in a case where the interval cycle is longer than the reference movement cycle (step S106: Yes), the movement detecting unit 50 outputs the difference calculated at step S105 to the movement change determining unit 80 as the delay time (step S107). In a case where the interval cycle is shorter than the reference movement cycle (step S106: No), the movement detecting unit 50 outputs the delay time to the movement change determining unit 80 as zero (step S108).

In a case where the movement of the wiper cannot be determined in the movement detecting unit 50, that is, in a case where at step S102 the reduction time is not detected, or in a case where at step S104 the difference between the interval cycle and the reference movement cycle goes beyond the threshold, although the movement start notice of the wiper is received from the in-vehicle processor CP, there is a possibility that the wiper does not move or does not normally move according to the movement mode. The movement detecting unit 50 outputs the determination result to the warning unit 90.

The movement change determining unit 80 determines a movement change of the wiper based upon the delay time that is input by the movement detecting unit 50 (step S109).

As described before, when the rainfall becomes lighter and the amount of rain droplets on the glass surface G becomes smaller, there is a tendency that the friction between the glass surface G and the wiper arm WA increases and the movement speed of the wiper becomes slower. In this case, the delay time also becomes longer. That is, a length of the delay time becomes a reference for determination of stopping the wiper or reducing a speed of the wiper.

A specific determination reference of the movement change is not limited to a particular one, but may be set optionally. For example, in a case where the delay time of the wiper is longer than a predetermined threshold, the wiper may be stopped. Further, by step-by-step providing thresholds, determination of not only the stop of the wiper but also the change in the movement mode or the like may be performed.

In addition, for example, a delay time map as illustrated in FIG. 8 is stored in the memory, and the movement change determining unit 80 may determine the change in the movement mode by referring to the delay time map.

As illustrated in FIG. 8, the delay time map defines a relationship between a delay time of the wiper and a wiper delay level. The wiper delay level is an index for step-by-step evaluating a level of the delay time in the wiper. The movement change determining unit 80 specifies to which wiper delay level the delay time that is input by the movement detecting unit 50 corresponds in the delay time map. The movement change determining unit 80 specifies the wiper delay level as "1" in a case where the delay time is 20 ms, and specifies the wiper delay level as "5" in a case where the delay time is 90 ms, for example. The movement change determining unit 80 may determine, for example, stopping the wiper in a case where the wiper delay level corresponds to "8" or more, reducing a speed of the wiper in a case where the wiper delay level corresponds to from "4" to less than "8", and not changing the movement of the wiper in a case where the wiper delay level corresponds to less than "3".

The movement change determining unit 80, in a case where the stop of the movement of the wiper or the change in the speed of the wiper is determined, transmits the determination result to the in-vehicle processor CP through the communication unit 10. The in-vehicle processor CP performs control of stopping the output of a driving signal to the wiper motor WM to stop the wiper. In addition, at the time of stopping the wiper, a movement stop notice of the wiper is transmitted to the communication unit 10 in the wiper movement detecting device 1.

The movement detecting unit 50 repeats the processing from step S102 to step S109 until receiving the movement stop notice of the wiper (step S110: No). The movement detecting unit 50 executes the determination processing of the movement in the wiper for a predetermined time (step S111) upon receiving the movement stop notice of the wiper (step S110: Yes). As indicated in the movement stop notice of the wiper, this is because of confirming that the movement of the wiper is normally stopped. The processing of the determination is as similar to step S102 to step S105. The movement detecting unit 50, in a case where it is determined that the movement of the wiper is stopped (step S111: No), ends the processing. On the other hand, in a case where the movement detecting unit 50 determines that the wiper is moving (step S111: Yes), since the movement of the wiper is not stopped regardless of receiving the movement stop notice of the wiper from the in-vehicle processor CP, there is a possibility that abnormality occurs in the wiper motor WM. In this case, the movement detecting unit 50 outputs the determination result to the warning unit 90.

In step S102, S104 or S111, in a case where the movement detecting unit 50 outputs the determination result to the warning unit 90, the warning unit 90 generates a warning signal, which is transmitted to the in-vehicle processor CP through the communication unit 10 (step S112).

As described above, the wiper movement detecting device 1 according to the embodiment is provided with:

(1) the optical sensor 30 that is installed to face the glass surface G in a vehicle and detect illuminance in an area of the glass surface G where the wiper that reciprocates along the glass surface G passes through, and the movement detecting unit 50 configured to detect a reduction time in which the illuminance detected by the optical sensor 30 temporarily reduces due to the passing of the wiper and determine the movement of the wiper from an interval cycle based upon an interval between the reduction times.

When the wiper passes through the detection area DA of the optical sensor 30, the reduction time in which the detection illuminance temporarily reduces appears intermittently. This reduction time is detected, and the movement of the wiper can be determined from the interval cycle based upon the interval between the reduction times. In many cases the optical sensor 30 is preliminarily installed in a vehicle for lighting control of a headlight. Therefore, for example, in contrast to a case of detecting the movement of the wiper from the pulse signal outputted from the wiper motor WM, introduction of components such as connectors and wire harnesses, hardware and software is not required. Thereby it is possible to provide the wiper movement detecting device simplified and reduced in costs. Further, from the detection of the wiper movement, the movement of the wiper can be changed in response to a change in the rainfall state and abnormality of the wiper can be detected, thus improving safety and comfortableness of a vehicle.

(2) The movement detecting unit 50 performs the determination of the movement in the wiper in response to the movement start notice of the wiper that is input from the in-vehicle processor CP (control device) that controls the movement of the wiper, and is provided with the warning unit 90 configured to communicate abnormality of the wiper in a case where the movement of the wiper is not determined by the movement detecting unit 50.

In a case where the movement detecting unit 50 cannot determine the movement of the wiper although the movement start notice of the wiper is input from the in-vehicle processor CP, the abnormality of the wiper motor WM is assumed to occur. In such a case, a driver can quickly recognize the abnormality of the wiper by outputting a warning.

(3) In a case where the movement of the wiper is determined by the movement detecting unit 50 after the movement stop notice of the wiper is input from the in-vehicle processor CP, there is provided the warning unit 90 configured to communicate the abnormality of the wiper.

In a case where the wiper is moving although the movement stop notice of the wiper is input from the in-vehicle processor CP, the abnormality of the wiper motor WM is assumed to occur. In such a case, a driver can quickly recognize the abnormality of the wiper by outputting a warning.

(4) The movement detecting unit 50 determines the movement of the wiper based upon an interval cycle between a reduction time and a reduction time ahead of two reduction times therefrom.

The wiper passes through the detection area DA twice in one time of the movement cycle in which the wiper reciprocates on the glass surface G. Therefore an interval cycle between a reduction time and a reduction time ahead of two reduction times therefrom becomes equal to the movement cycle of the wiper. In this way, it is possible to easily determine the movement of the wiper based upon the interval cycle between the reduction times (5) The movement detecting unit 50 determines that the wiper is moving in a case where the difference between the interval cycle and the reference movement cycle is equal to or less than a threshold, and the wiper movement detecting device 1 is provided with the warning unit 90 configured to communicate the abnormality of the wiper in a case where the difference between the interval cycle and the reference movement cycle goes beyond the threshold.

In a case where the difference between the interval cycle between the calculated reduction times and the reference movement cycle is excessively large, it is not due to the delay by a change in a rainfall state, but there is a high possibility that the abnormality occurs in the wiper motor WM. In such a case, a driver can quickly recognize the abnormality of the wiper by outputting a warning.

(6) The movement detecting unit 50 determines that the wiper is moving in a case where the difference between the interval cycle and the reference movement cycle is equal to or less than a threshold, and the wiper movement detecting device 1 is further provided with the movement change determining unit 80 that determines necessity of a change in a movement of the wiper based upon the difference (delay time) between the interval cycle and the reference movement cycle. Specifically the movement change determining unit 80 determines a stop of the movement of the wiper in a case where the difference (delay time) between the interval cycle and the reference movement cycle is longer than a predetermined time.

When the glass surface G is fully wet with rain droplets, there is a tendency that the movement speed of the wiper becomes fast as a result of a function of water as a lubricant. On the other hand, when the rain droplets reduce in amounts, there is a tendency that the movement speed of the wiper becomes slow as a result of an increase in a friction between the wiper and the glass surface G. That is, when the amount of the rain droplets attached on the glass surface G reduces due to a change in the rainfall state or the like, the interval time gets longer in response to the reduced amount to make the difference between the interval time and the reference movement cycle larger, thus increasing the delay time of the wiper.

Accordingly it is possible to determine a change in the rainfall state that gives an influence on the amount of the rain droplets to be attached on the glass surface G by calculating the delay time of the wiper. It is possible to perform an accurate control of the wiper by determining the necessity of the change in the wiper movement such as stopping or slowing the movement of the wiper based upon the change in the rainfall state.

(7) The reference movement cycle is preliminarily determined in accordance with a plurality of movement modes each having a movement speed and an intermittent time of the wiper differing from each other. The movement start notice of the wiper that is input from the in-vehicle processor CP includes a notice of the movement mode for causing the wiper to be moved. The movement detecting unit 50 calculates a difference between a reference movement cycle in accordance with the movement mode indicated by the movement start notice of the wiper and an interval cycle.

By preliminarily determining the reference movement cycle in accordance with the movement mode, the movement detecting unit 50 can perform comparison with the interval cycle using the reference movement cycle in accordance with the movement mode and can accurately detect the abnormality of the wiper or can calculate the delay time accurately.

(8) The optical sensor 30 is provided with the front light receiving element 32 that detects illuminance in front of the vehicle and the upper light receiving element 33 that detects illuminance above the vehicle, and the movement detecting unit 50 determines the movement of the wiper by detecting a reduction time of the illuminance detected by the front light receiving element 32.

As described before, in many cases the optical sensor 30 is preliminarily installed in the vehicle for lighting control of the headlight. Some of the optical sensors 30 that are used for the lighting control of the headlight each include the front light receiving element 32 and the upper light receiving element 33. Quick detection is made possible by using only the front light receiving element 32 out of the two light receiving elements for detection of the movement of the wiper.

[Modification 1]

In the embodiment, the necessity of the change in the movement of the wiper is determined based upon only the delay time of the wiper calculated from the output value of the optical sensor 30. In the modification 1, there will be explained an example in which an amount of rain droplets (water) wiped off by the wiper is found from an output value of the rain droplet sensor 40, and necessity of a change in the movement of the wiper is determined by a combination with the delay time. The rain droplet sensor 40 is, as explained in the embodiment, accommodated in the housing 21 of the sensor unit 20 to be integral with the optical sensor 30.

Figure 9:
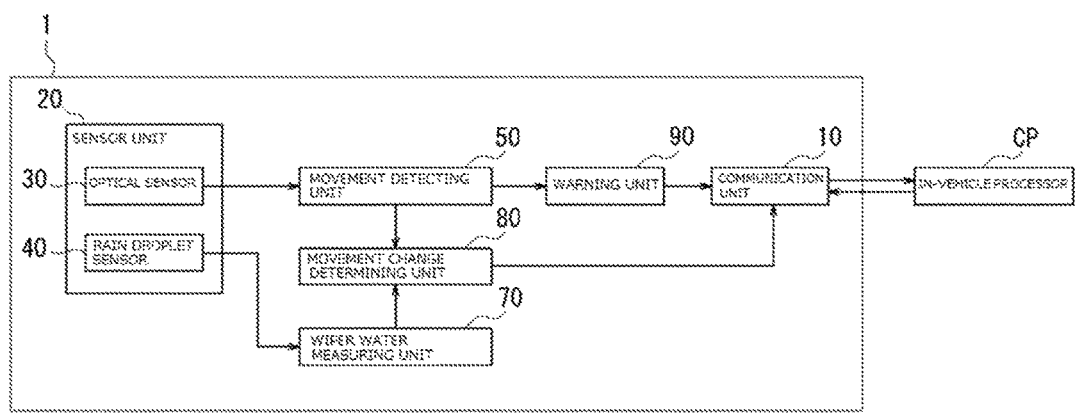
FIG. 9 is a block diagram illustrating the configuration of a wiper movement detecting device according to a modification of the present invention.

FIG. 9 is a block diagram illustrating the configuration of a wiper movement detecting device according to the modification 1. A wiper movement detecting device 1 according to the modification 1 is provided with a wiper water measuring unit 70 in addition to the configuration of the embodiment. The wiper water measuring unit 70 measures an amount of water wiped off by a wiper, based upon an output value of the light receiving element 42 of the rain droplet sensor 40.

Figure 10:
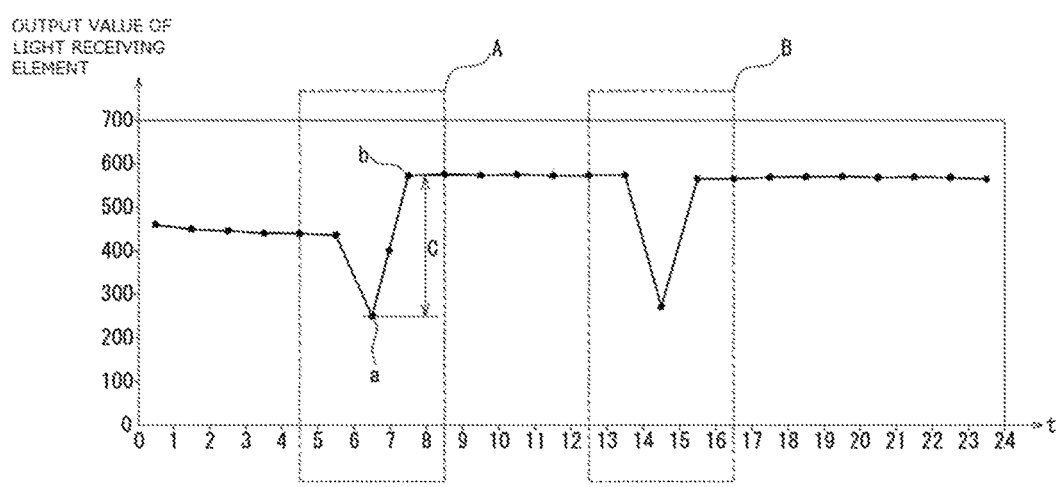
FIG. 10 is a graph illustrating an example of a change in an output value of alight receiving element in the rain droplet sensor.

FIG. 10 is a graph illustrating an example of a change in the output value of the light receiving element 42 in the rain droplet sensor 40.

When the wiper passes through the detection face D (refer to FIG. 5B) of the rain droplet sensor 40 set on a surface of the glass surface G, rain droplets attached on the detection face D are wiped off by the wiper for a reflection condition of light on the detection face D to largely change. Therefore the output value of the light receiving element 42 largely changes at the passing of the wiper.

In a case of FIG. 10, a change in the output value of the light receiving element 42 within a dotted-line frame indicated in each of codes A and B shows the passing of the wiper. As described before, the wiper reciprocates between the initial position P1 and the reverse position P2. The change in the output value of the light receiving element 42 within the dotted-line frame indicated in the code A is a change due to the movement (forward movement) from the initial position P1 to the reverse position P2 of the wiper. The change in the output value of the light receiving element 42 within the dotted-line frame indicated in the code B is a change due to the movement (backward movement) from the reverse position P2 to the initial position P1 of the wiper.

The wiper moves while scraping together rain droplets attached on the glass surface G. Therefore the output value of the light receiving element 42 at the passing of the wiper on the detection face D once reduces by the scraped water, and abruptly increases at a point where the wiping-off of the rain droplets is completed by the passing of the wiper. Accordingly the output value in a point indicated by a code "a" is an output value when the scraped water is positioned on the detection face D. The output value in a point indicated by a code "b" is an output value when the wiping-off is completed.

Here, since a difference (indicated in a code "C" in the figure) between the output value in a point "a" and the output value in a point "b" is substantially equivalent to the amount of the water wiped off by the wiper, when the amount of rain droplets is found based upon the output value in a point indicated in the code "a", the amount of the water wiped off by the wiper is found out.

The wiper water measuring unit 70 determines the minimum output value (indicated in the code "a" in the figure) out of the output values of the light receiving element 42 at the forward movement of the wiper as an evaluation value, and compares the determined evaluation value with an evaluation value at the forward movement of the wiper performed one time before.

In a case where the evaluation value of this time is larger than the evaluation value of the previous time (in a case where the amount of the water wiped off by the wiper is reduced), a difference in the evaluation value is found by subtracting the evaluation value of the previous time from the evaluation value of this time. The wiper wiped water map stored in an unillustrated memory unit is referred to based upon the found difference to specify the amount of the water wiped off by the wiper.

FIG. 11 is an explanatory diagram explaining the wiper wiped water map.

In the wiper wiped water map, a relation between a change amount of an evaluation value at the wiper passing and an amount of water wiped off by the wiper is defined, and finding the change amount of the evaluation value at the wiper passing enables a level of the amount of water wiped off by the wiper (wiper water level) to be specified. For example, in a case where the change amount is 100, the wiper water level is specified as "3", and in a case where the change amount is 300, the wiper water level is specified as "9".

The wiper water measuring unit 70 generates wiped-water information indicative of the wiper water level when the wiper water level of the amount of the water wiped off by the wiper is specified. The wiper water measuring unit 70 outputs the generated wiped-water information to the movement change determining unit 80.

The movement change determining unit 80, as similar to the embodiment, uses the delay time map illustrated in FIG. 8 to specify the wiper delay level from the delay time that is input by the movement detecting unit 50. In the modification 1, the movement change determining unit 80 further uses a correction coefficient map stored in the memory to specify a wiper stop correction coefficient from the wiper delay level.

FIG. 12 is an explanatory diagram explaining the correction coefficient map.

The correction coefficient map defines a relation between a wiper delay level and a wiper stop correction coefficient. The wiper stop correction coefficient is a coefficient for determining necessity of the stop of the wiper movement. The movement change determining unit 80 specifies to which wiper stop correction coefficient the specified wiper delay level corresponds in the correction coefficient map. The movement change determining unit 80 specifies the wiper stop correction coefficient as "1" in a case where the wiper delay level is "5", for example.

Here, in the embodiment, a case where the wiper stop correction coefficient is "3" indicates that the glass surface G is dry, a case where the wiper stop correction coefficient is "2" indicates that the glass surface G is substantially dry, a case where the wiper stop correction coefficient is "1" indicates that the glass surface G is a little wet, and a case where the wiper stop correction coefficient is "0" indicates that the glass surface G is sufficiently wet.

In a case where the delay time is equal to or more than 64 ms (the wiper delay level is equal to or more than "4"), it is determined that a substantial delay is generated in the movement speed of the wiper to set the wiper stop correction coefficient to be equal to or more than "1". It should be noted that in the correction coefficient map, in a case where the level of the delay time is less than "3", the wiper stop correction coefficient is set to become "0". This is because of preventing an error of the detection result in the optical sensor 30 from affecting the determination in the movement change determining unit 80.

The movement change determining unit 80 determines necessity of a change in the movement of the wiper, based upon the wiper stop correction coefficient specified based upon the delay time and the wiped water information that is input by the wiper water measuring unit 70. In an example shown herein, the movement change determining unit 80 determines the necessity of a stop in the movement of the wiper. The movement change determining unit 80 determines the necessity of the stop in the movement of the wiper by referring to a determination map stored in the memory.

FIG. 13 is an explanatory diagram explaining the determination map.

The determination map defines a threshold of a wiper water level for determining the stop of the movement of the wiper, for each of wiper stop correction coefficients.

In the determination map, as the wiper stop correction coefficient is the larger, the threshold of the wiper water level for determining the stop of the movement of the wiper is defined to be the larger. For example, in a case where the wiper stop correction coefficient is "0", the threshold of the wiper water level is "2", and in a case where the wiper stop correction coefficient is "1", the threshold of the wiper water level is "4". In a case where the wiper stop correction coefficient is "3", the threshold of the wiper water level is "16".

The movement change determining unit 80 refers to this determination map to compare the wiper water level indicated by the wiped water information that is input by the wiper water measuring unit 70 with the threshold defined in the specified wiper stop correction coefficient. The movement change determining unit 80 determines the stop of the wiper in a case where the wiper water level is less than the threshold. For example, in a case where the wiper water level is "3" and the wiper stop correction coefficient is "1", since the wiper water level is less than "4" of the threshold indicated in the determination map, the movement change determining unit 80 determines the stop of the movement of the wiper.

By defining the determination map in this way, the amount of the water to be attached on the glass surface G is reduced, and as the delay time of the movement of the wiper is the longer (as the stop correction coefficient is the larger), even if the amount of the water to be wiped off by the wiper is the larger (the wiper water level is the higher), the stop of the wiper tends to be easily determined.

In a case where the movement change determining unit 80 determines the stop of the movement of the wiper, the movement change determining unit 80 transmits the determination result to the in-vehicle processor CP through the communication unit 10. The in-vehicle processor CP performs control of stopping output of a driving signal to the wiper motor WM to stop the wiper.

In this way, in the modification 1, the necessity of the change in the movement of the wiper is determined using the output value of the rain droplet sensor 40 in addition to the output value of the optical sensor 30. Since the detection value of the rain droplet sensor 40 as well reflects the change in the amount of the rain droplets attached on the glass surface G, that is, the change in the rainfall state, it is possible to perform the control of the wiper in response to the change in the rainfall state more accurately. This control can improve comfortability of a driver.

In the modification 1, a case where the optical sensor 30 and the rain droplet sensor 40 are integrally accommodated in the housing 21 of the sensor unit 20 is explained, but not limited thereto, the optical sensor 30 and the rain droplet sensor 40 may be provided to be separated from each other.

In addition, the optical element that emits infrared light is used as the sensor that detects the amount of the rain droplets on the glass surface G, but the sensor is not limited thereto. As long as the measurement of the amount of rain droplets and the estimation of the rainfall state are made possible, it is possible to adopt the rain droplet sensor 40 using an ultrasonic wave or the rain droplet sensor 40 using a pressure-sensitive system, for example.

[Modification 2]

In the embodiment, the movement detecting unit 50 uses only the illuminance detected by the front light receiving element 32 in the optical sensor 30, but is not limited thereto. Illuminance detected by the upper light receiving element 33 instead of the front light receiving element 32 may be used, or illuminances detected by both of the front light receiving element 32 and the upper light receiving element 33 may be used. A use method of both the illuminances is not limited to a particular one, but, for example, only when reduction times are detected from both the illuminances, it may be determined that the wiper has moved. The movement of the wiper can be accurately detected by using the detection results of both of the front light receiving element 32 and the upper light receiving element 33.

DESCRIPTION OF REFERENCE NUMERALS

1 Wiper movement detecting device
10 Communication unit
20 Sensor unit
21 Housing
22 Bracket
23 Cover
24 Substrate
30 Optical sensor
31 Lens
31*a* Front-light light guiding unit
31*b* Upper-light light guiding unit
32 Front light receiving element
33 Upper light receiving element
34 Cover member
40 Rain droplet sensor
41 Light emitting element
42 Light receiving element
43 Prism
43*a* Plate-shaped portion
43*b* Light guiding portion
50 Movement detecting unit
70 Wiper water measuring unit
80 Movement change determining unit
90 Warning unit
DA Detection area
D Detection face
G Glass surface
S Rain droplet
W Wiper
WA Wiper arm
WM Wiper motor
CP In-vehicle processor

What is claimed is:

1. A wiper movement detecting device comprising:
    an optical sensor that is installed to face a glass surface in a vehicle and detect illuminance in an area of the glass surface where the wiper that reciprocates along the glass surface passes through; and
    a movement detector configured to detect a reduction time in which the illuminance detected by the optical sensor temporarily reduces due to the passing of the wiper and determine a movement of the wiper from an interval cycle based upon an interval between the reduction times,
    wherein the movement detector determines that the wiper is moving in a case where a difference between the interval cycle and a reference movement cycle is equal to or less than a threshold.

2. The wiper movement detecting device according to claim 1, wherein the movement detector performs determination of the movement of the wiper in response to a movement start notice of the wiper that is input from a controller that controls the movement of the wiper, further comprising:
    a warning indicator configured to communicate abnormality of the wiper in a case where the movement of the wiper is not determined by the movement detector.

3. The wiper movement detecting device according to claim 1, further comprising:
    a warning indicator configured to communicate abnormality of the wiper in a case where the movement of the wiper is determined by the movement detector after a movement stop notice of the wiper is input from a controller that controls the movement of the wiper.

4. The wiper movement detecting device according to claim 1, wherein the movement detector determines the movement of the wiper based upon another interval cycle between the reduction time and a reduction time ahead of two reduction times from the reduction time.

5. The wiper movement detecting device according to claim 1, the wiper movement detecting device further comprising a warning indicator configured to communicate abnormality of the wiper in a case where the difference between the interval cycle and the reference movement cycle goes beyond the threshold.

6. The wiper movement detecting device according to claim 1, the wiper movement detecting device further comprising a movement change processor configured to determine necessity of a change in the movement of the wiper based upon the difference between the interval cycle and the reference movement cycle.

7. The wiper movement detecting device according to claim 5, wherein:

the reference movement cycle is preliminarily determined in accordance with a plurality of movement modes each differing in a movement speed and an intermittent time of the wiper, a movement start notice of the wiper that is input from a controller that controls the movement of the wiper includes a notice of a movement mode for moving the wiper, and the movement detector calculates a difference between a reference movement cycle in accordance with the movement mode indicated by the movement start notice of the wiper and the interval cycle.

8. The wiper movement detecting device according to claim 6, wherein the movement change processor determines a stop of the movement of the wiper in a case where the difference between the interval cycle and the reference movement cycle is longer than a predetermined time.

9. The wiper movement detecting device according to claim 1, wherein:

the optical sensor includes a front light receiving element that detects illuminance in front of a vehicle, and an upper light receiving element that detects illuminance above the vehicle, and the movement detector determines the movement of the wiper using the illuminance detected by any of the front light receiving element and the upper light receiving element.

10. The wiper movement detecting device according to claim 1, wherein:

the optical sensor includes a front light receiving element that detects illuminance in front of a vehicle, and an upper light receiving element that detects illuminance above the vehicle, and the movement detector determines the movement of the wiper using illuminances detected by both of the front light receiving element and the upper light receiving element.

11. The wiper movement detecting device according to claim 2, wherein the movement detector determines the movement of the wiper based upon another interval cycle between the reduction time and a reduction time ahead of two reduction times from the reduction time.

12. The wiper movement detecting device according to claim 2, the wiper movement detecting device further comprising a warning indicator configured to communicate abnormality of the wiper in a case where the difference between the interval cycle and the reference movement cycle goes beyond the threshold.

13. The wiper movement detecting device according to claim 2, the wiper movement detecting device further comprising a movement change processor configured to determine necessity of a change in the movement of the wiper based upon the difference between the interval cycle and the reference movement cycle.

14. The wiper movement detecting device according to claim 3, wherein the movement detector determines the movement of the wiper based upon another interval cycle between the reduction time and a reduction time ahead of two reduction times from the reduction time.

15. The wiper movement detecting device according to claim 3, the wiper movement detecting device further comprising a warning indicator configured to communicate abnormality of the wiper in a case where the difference between the interval cycle and the reference movement cycle goes beyond the threshold.

16. The wiper movement detecting device according to claim 3, the wiper movement detecting device further comprising a movement change processor configured to determine necessity of a change in the movement of the wiper based upon the difference between the interval cycle and the reference movement cycle.

17. The wiper movement detecting device according to claim 6, wherein:

the reference movement cycle is preliminarily determined in accordance with a plurality of movement modes each differing in a movement speed and an intermittent time of the wiper, a movement start notice of the wiper that is input from a controller that controls the movement of the wiper includes a notice of a movement mode for moving the wiper, and the movement detector calculates a difference between a reference movement cycle in accordance with the movement mode indicated by the movement start notice of the wiper and the interval cycle.

18. The wiper movement detecting device according to claim 17, wherein the movement change processor determines a stop of the movement of the wiper in a case where the difference between the interval cycle and the reference movement cycle is longer than a predetermined time.

19. The wiper movement detecting device according to claim 8, wherein:

the optical sensor includes a front light receiving element that detects illuminance in front of a vehicle, and an upper light receiving element that detects illuminance above the vehicle, and the movement detector determines the movement of the wiper using the illuminance detected by any of the front light receiving element and the upper light receiving element.

20. A wiper movement detecting device comprising:

an optical sensor that is installed to face a glass surface in a vehicle and detect illuminance in an area of the glass surface where the wiper that reciprocates along the glass surface passes through;

a movement detector configured to detect a reduction time in which the illuminance detected by the optical sensor temporarily reduces due to the passing of the wiper and determine a movement of the wiper from an interval cycle based upon an interval between the reduction times; and a warning indicator configured to communicate abnormality of the wiper in a case where the movement of the wiper is not determined by the movement detector, and in a case where the movement of the wiper is determined by the movement detector after a movement stop notice of the wiper is input from a controller that controls the movement of the wiper, wherein the movement detector determines that the wiper is moving in a case where a difference between the interval cycle and a reference movement cycle is equal to or less than a threshold.

* * * * *